3,193,393
PROTECTING PACKAGED HEAT-PROCESSED AQUEOUS FOOD FROM OXYGEN DETERIORATION
Don Scott, Chicago, Ill., assignor to Fermco Laboratories, Inc.
No Drawing. Filed Oct. 31, 1961, Ser. No. 148,828
5 Claims. (Cl. 99—182)

This invention relates to a method of and means for protecting packaged, heat-processed, water-containing foods and beverages against deterioration due to the oxygen, said contents normally being subjected to heating during such steps as filling, pasteurizing and packing operations.

The method of the present invention comprises bringing the water-containing foods and beverages into contact with heat stabilized enzymatic oxidase preparation in which the enzyme components are first stabilized against destruction by heat and oxygen through essentially complete drying and then protected against heat in the presence of moisture by coating the dry stabilized enzymatic oxidase preparation with a moisture permeable barrier layer whose amount and composition controls the access of aqueous medium and/or moisture vapor to the enzymes in said preparation. The moisture impermeable barrier prevents transfer of enzyme-activating moisture from the aqueous product to the stabilized enzymes in said preparation for a predeterminable minimal interval of time in order to insure that the enzyme activation will take place at an appropriate time for overcoming the deleterious action of oxygen either in a gaseous atmosphere and/or in solution.

It is well known that various heat-processed foods and beverages are adversely affected by oxygenation of the product. Oxidation brings about changes which result in the appearance of cloudiness in, for example, fruit juices such as apple juice, and off-flavor in canned vegetables such as asparagus, peas and the like, thereby detracting from the quality of the initial packing. Oxidation also can result in the impairment of color and flavor of carbonated or non-carbonated canned or bottled soft drinks, which products must have an appreciable storage life. Not only does the color of such soft drinks tend to fade and the flavor thereof becomes impaired, but there may be iron pickup from the container and eventual perforation of the container because of the direct or indirect chemical and corrosive action of oxygen which is present in solution or in the space above the top surface of the beverage.

Heretofore, the suggestion has been made as in Patent No. 2,482,724, the reissue thereof, Re. 23,523, and Patent No. 2,651,592, that an enzyme, preferably glucose oxidase, be added to sealed containers of the food in order to consume the oxygen therein. By combining glucose oxidase enzyme with a catalase enzyme, hydrogen peroxide, ordinarily produced, may be decomposed into water and oxygen which is capable of further reacting with glucose in the presence of the glucose oxidase enzyme catalyst.

The glucose oxidase reaction is specific for the aldose sugar, glucose. The product of reaction of the enzymatic elimination of free oxygen from the canned food stuff is gluconic acid, in amounts determined by the amount of free oxygen present, which product is well recognized as a harmless by-product in the food. While it has been long recognized that the treatment of products with glucose oxidase and catalase enzyme mixtures prior to sealing the cans or packages is an effective way of removing oxygen, the practical application of such a system has of necessity been confined to the incorporation of enzymatic oxidase preparation while the food stuff is at or near room temperature. The available enzyme preparations when added to the food product at high temperatures, such as are encountered during hot filling and vacuum packing operation, utilized, for example, in the preparation of baby foods, apple juice, canned dog foods and the like, are rapidly destroyed due to the effect of high temperatures in the presence of the aqueous medium. This destruction of the enzyme is appreciable at elevated temperatures and destruction is accelerated as the temperature is increased. Temperatures above about 60° C., depending upon the characteristics of the aqueous medium, cause such rapid destruction of the enzyme, particularly glucose oxidase enzyme, as to substantially completely impair the capacity of the enzyme to consume the available oxygen in the container of food stuff.

The surprising discovery has been made that enzymatic oxidase preparations may be stabilized in a dormant reactivatable form and that such stabilized enzymatic oxidase compositions, when provided with a moisture barrier coating, can be adapted to withstand destruction at temperatures in excess of 40° C. and even at temperatures in excess of 100° C., as are employed during such operations as hot filling, pasteurizing and the like. The enzyme preparation is stabilized by thoroughly drying the same to a substantially constant weight. In drying the aqueous enzyme preparation, the dehydration may be carried out at progressively higher temperatures as the water content is reduced. While the enzyme is in an aqueous medium or in the form of a solid containing an appreciable percentage of water, the temperature thereof should be maintained below about 45° C. As the enzyme solids become progressively drier, the temperature of dehydration may be progressively raised until at moisture contents of less than 0.5%, the dehydration of enzyme may be carried out at temperatures of the order of 60° C. to 70° C. without deleterious effects upon the activity of the enzyme. In general, the enzymes are in a satisfactory dry condition for coating if they lose no weight when subjected to temperatures of 45° C. in a vacuum chamber for 30 minutes.

This heat stabilized enzyme preparation, prior to incorporation in the aqueous product at the high temperatures encountered in packing, is coated with a composition whose rate of dissolution or permeation by water or water vapor will maintain the enzyme dry for any period of time during which the enzyme would be expected to be subject to destructive or inactivating influences in the presence of activating quantities of moisture, thereby providing a predeterminable interval between contact of the coated enzyme with aqueous medium and moisturizing of the enzyme to a water content such that, if glucose and oxygen are present, the enzyme will act thereon.

Coating compositions of the type useful in this invention are film forming materials having a slow rate of dissolution in aqueous media or a slow rate of penetration by moisture. Materials useful in the formation of these films or coatings are the so-called water-insoluble synthetic gums such as ethylcellulose, alkali soluble cellulose and cellulose derivatives, nitrocellulose, cellulose acetate and the like, water-insoluble, alcohol-soluble natural resinous gums such as shellac, keratin and the like, water-insoluble alcohol-soluble proteins such as zein, formaldehyde treated proteins and the like, and water-insolubilized synthetic polymeric material such as polyvinyl acetate copolymer, and the like.

The coating composition serves to effectively separate the stabilized glucose oxidase-catalase enzyme preparation from the aqueous product. After a period of time dependent upon characteristics of the coating, coating thickness, etc., the coating is penetrated by moisture and the enzymatic oxidase composition will be moisturized and subsequently reactivated. The water of the aqueous product may reach the enzyme through any one or more of a variety of means such as slow solution of the coating, distintegration of the coating as evidenced by flaking or by rupture, erosion of the coating, diffusion through the coating and the like.

In the absence of such a coating, the dried enzyme does not display sufficient stability in the presence of substantial moisture to withstand temperatures above 60° C. for any extended length of time without destroying substantial quantities of the enzyme and consequently losing a high percentage of the enzyme activity. It is surprising that the mere exclusion of moisture should protect the heat-sensitive enzyme of the preparation so that a substantial part of the enzymes activity is retained even after having been subjected to heat processing operations. The advantage of adding the coated dry enzyme preparation directly to products such as food stuffs prior to their hot packing operation or during said operation in accordance with the present invention, as compared with the inability of the prior art enzyme compositions to be subjected to elevated temperatures after they have been incorporated in the aqueous food stuff, is believed to be obvious. The incorporation of the enzyme preparation in accordance with the invention permits economy and latitude in processing operations since the preparation may be applied to the container prior to filling or may be added in the appropriate amount at any time during processing prior to permanent sealing, for example, to the hot filled product just prior to closing.

The stabilized enzyme preparation may be included in the internal surface coating of the can, can top, bottle or jar top or cap, said surface coating containing the thoroughly dry enzyme preparation encased in protective coating. The binder in such coating may be moisture resistant film former in which is incorporated the dry enzyme stabilized against heat. This coating may be subjected, if necessary, to a preliminary drying operation in order to insure that the stabilization of the heat stabilized glucose oxidase-catalse preparation has not been impaired.

In certain instances, such as with tablets or coatings containing the heat-stabilized desiccated enzyme preparation of the present invention, it may be desirable to introduce therein the glucose substrate for the oxidase enzyme present in the tablet or coating. If glucose is already present in the product to be protected from the harmful effects of free oxygen, then such addition of glucose in the enzyme preparation is not necessary. The glucose already present in the food is caused to oxidize with the ultimate production of harmless gluconic acid.

Frequently, glucose is not present in the product, but instead there is present some other sugar, such as maltose, sucrose, lactose, etc. In such case, glucose is introduced into the enzyme preparation in an amount which is sufficient to provide the substrate for the glucose oxidase and results in the elimination of the free oxygen by the oxidation of the glucose which has been added.

A further alternative is presented by incorporating in the tablet or coating wherein glucose is absent and such sugars as maltose, sucrose, lactose or the like are the sugars in the aqueous food, the additional corresponding enzyme, namely, maltase, invertase, or lactase, respectively, which corresponds to the particular sugar substrate and breaks down said substrate in the food to glucose. Thus, in the example of beer which contains no glucose, maltose may be present. By addition of maltase to beer, the maltose is hydrolyzed into glucose which in turn will act as a suitable substrate for the glucose oxidase enzyme.

Similarly, if the condensed sugar is sucrose, the enzyme invertase converts the substrate into glucose. With lactose as the condensed carbohydrate in the food, lactase in the added enzyme preparation converts the lactose into glucose for the oxidase present. In the event that it is desired to convert starch as the condensed product into a glucose substrate for the oxidase present, the enzyme diastase in combination with maltase can be employed.

In certain kinds of oxidation reactions such as the oxidation of ascorbic acid or iso-ascorbic acid, the formation of hydrogen peroxide results in the same objectionable effects upon the taste and color of the aqueous food product as does the persence of free oxygen. The improved heat-stable enzyme compositions of the present invention are useful in the elimination of this hydrogen peroxide because of the presence of the enzyme catalase in the preparation. Catalase consumes hydrogen peroxide even though it is formed by an action other than that which may involve glucose oxidase.

In the foregoing modifications of the heat-stable enzyme preparations of the invention wherein glucose is incorporated in the enzyme composition, the oiling of the granulated or tableted desiccated enzyme preparation prior to the coating operation is of particular advantage. In this oiling operation of the thoroughly dried enzyme preparation mineral oil is utilized as a thin coating over the enzyme. After the subsequent application of a coating, for example, of zein about the oiled preparation, the drying of the protected composition is easier than in the case where the oiling is omitted.

The enzyme may be directly combined with a coating substance in solution and thereafter dried to provide a heat stabilized preparation in accordance with the invention, or the preparation may be in granule, pellet, or tablet form.

Pellets or tablets containing the heat-stabilized preparation of the present invention, may contain various binders such as gum acacia, gelatin, sucrose, glucose, starch, and the like.

To facilitate disintegration of the pellets or tablets, a disintegrator may be employed such as potato starch or corn starch in amounts of about 5 to 10% by weight based on the total weight of the composition. If the tablet is to be employed in an acid food product, sodium bicarbonate may be incorporated in the tablet to aid disintegration. In other instances, if desired, a stoichiometrically balanced blend of an alkali metal bicarbonate, such as sodium bicarbonate, together with an organic dry food acid may be employed as the disintegrator in dry form in amounts of about 3 to 8% by weight. The dry food acid, such as critic acid, reacts with the sodium bicarbonate upon coming in contact with free water in the food to cause the evolution of carbon dioxide and the disintegration of the tablet which liberates the enzyme into the aqueous food product.

The binders and disintegrators as well as other solids in the tablet or coating serve as diluents which are inert with respect to the enzyme activity. These solid diluents may include other materials such as filter aid, kaolin, salt and the like.

Another form of diluent having utility is mannitol. In any coating composition there is always the danger that the coating will be imperfect and that pores will exist extending from the surface to the interior of the coated solids, which would permit premature wetting of the enzyme, for example, with water at a temperature sufficiently high to destroy the enzyme activity. If the wetting is of a limited extent, the effect of contact between enzyme and hot water may be alleviated by the use of mannitol. Mannitol dissolves with an endothermic reaction which will have a cooling effect and will lengthen the time between wetting and appreciable deactivation of the enzymatic composition.

Useful glucose oxidase-catalase enzyme mixtures are commercially available, for example, in a solution having a glucose oxidase activity of about 750 units per cc. and a catalase activity of about 350 units per cc.

Catalase may be prepared separately, for example, by the process of Patent No. 2,635,069 and added to glucose oxidase, which may be prepared by the method of Coulthard et al., described in Biochemical Journal, vol. 39, page 24, 1945.

An active glucose oxidase enzyme having a high catalase activity may also be prepared from a species of Penicillium as shown in Patent No. 2,482,724.

The amount of desiccated glucose oxidase-catalase enzyme employed depends upon the activity of the enzyme and the amount of free or molecular oxygen which is to be removed from the aqueous food product in its sealed or closed condition in the food container. This amount may be readily determined in view of the standardization of the activity of the glucose oxidase enzyme and the activity of the catalase enzyme.

One unit of glucose oxidase may be defined as that amount of enzyme which will cause the uptake of 10 cubic millimeters of oxygen per minute at 30° C. under assay conditions described by Scott, Journal of Agricultural and Food Chemistry, vol. 1: 727–30 (1953).

To assay a standard enzyme solution for catalase activity, 0.04 cc. of the enzyme preparation is added to a 250 cc. beaker. Then 100 cc. of 5 volume hydrogen peroxide (1.5%) buffered to pH 7.0 is added to the beaker and the mixture is allowed to stand for about one hour at about 25° C. A 4 cc. sample of the resulting solution is withdrawn and mixed with 5 cc. of 2 N $H_2SO_4$ and 2 grams of potassium iodide. The resulting solution is then titrated with 0.25 N thiosulfate solution. Likewise a 4 cc. sample of the 5 volume hydrogen peroxide solution (without enzyme addition) is mixed with 5 cc. of 2 N $H_2SO_4$ and 2 grams of potassium iodide and also titrated with the same 0.25 N thiosulfate solution. In each case the disappearance of an iodine color in the titrated solution serves as the end point. Subtract the difference between the two titrations from which may be calculated the equivalent of hydrogen peroxide decomposed by the enzyme in the first solution. A unit of catalase may be defined as that amount of enzyme which, under the above conditions, will decompose .0155 equivalent or 0.264 gram of hydrogen peroxide under assay conditions.

In terms of aqueous glucose oxidase enzyme preparations which are readily available in commerce, preparations can be obtained which vary in solid concentration from about 3 to about 100 milligrams or upwards of solids per cubic centimeter of enzyme solution. This may represent a glucose oxidase activity of from 10 to 1500 units per cubic centimeter of enzyme solution. On a dry solids weight basis, the activity of such solids may vary between 1000 and 90,000 units of glucose oxidase activity per gram.

Since each unit on a dry solids basis cause the removal of 10 cubic millimeters of oxygen per minute at 30° C. under assay conditions, it is obvious that a dosage in excess of that required for the amount of free oxygen which is to be removed may readily be supplied to meet the specific requirements of the aqueous food product in the amount present in the standard size container in which said food is packaged.

For example, tablets or pellets containing the heat-stabilized glucose oxidase-catalase and coating materials of the present invention when employed for the removal of deleterious oxygen in 12 ounce containers of soft drinks, non-carbonated or carbonated, or of apple juice or of citrus fruit drinks in the same size container, provide effective stabilization permitting a shelf life extending to beyond 10 months and up to about a year with a glucose oxidase activity of about 15 to 25 units for the single pellet added to the container. Larger size containers of the food require only slightly larger pellet additions, for example, a 24 oz. container may be stabilized to the same extent with from 20–40 units of glucose oxidase enzyme.

In such glucose oxidase enzyme preparation about 2 to 4 units of catalase per 10 units of glucose oxidase is sufficient to catalyze the conversion of hydrogen peroxide produced enzymatically from the glucose substrate by the glucose oxidase. Larger amounts may be employed but tend to be wasteful of the enzyme and provide no additional benefit.

In the case where the stabilized glucose oxidase-catalase and, for example, zein coating preparation is employed in the form of a coating on the interior surface of a container the strength of the enzyme is of the same order as in the employment of the preparation in the form of pellets. Based upon the weight of the coating employed in the interior of the container from about 15 to about 45 units of glucose oxidase and about 5 to about 15 units of catalase provide sufficient activity notwithstanding the temperatures to which they are subjected during can filling, to stabilize 12 ounce cans of aqueous food product.

In instances where due to operational problems in filling the enzyme preparations of the invention are subjected to unusually high temperatures in the presence of aqueous food about 100° C. for appreciable periods of time, the destruction of the enzyme under these extremely severe conditions cannot be entirely prevented. However, the destruction is far less than with the commercial unstabilized preparations. It is helpful to use high doses—about 50–100% and higher—in order to retain ample strength after exposure to such severe conditions. However, under normal packing conditions such excess is not needed.

Following are set forth a number of examples which illustrate the preparation of and various methods of employing the heat-stabilized desiccated enzyme preparations of the present invention for the protection of heat-processed aqueous food stuffs from the deleterious action of free oxygen therein despite the exposure of the enzyme product in contact with the aqueous food product at elevated temperatures.

EXAMPLE I

*Preparation of heat-stabilized glucose oxidase-catalase enzyme*

An aqueous solution of glucose oxidase-catalase enzyme preparation is mixed with 1.1 volumes acetone in the cold. The precipitate is filtered off and then air-dried to remove the solvent and provide a solid pulverulent or powdered product and thereafter dried in a vacuum desiccator over calcium oxide. By checking the weight loss until a constant value is noted, the complete dryness of the preparation is assured. Twenty-five grams of this powdered enzyme assayed about 4,000 units as glucose oxidase per gram and about 2,000 units of catalase per gram.

Drying of the air dry product at normal room humidities is insufficient in the above preparation to provide satisfactory stability in accordance with the heat stability requirements in the presence of aqueous food as dictated by the filling temperature conditions for use in accordance with the invention. Rapid inactivation of the air dried product at temperatures of 85–90° C. was noted in that deterioration to about one-half enzyme strength in about 10 minutes was observed, depending on the room humidity during drying. This inactivation is suppressed and substantially eliminated by the complete and thorough removal of water in a vacuum desiccator or drying in a forced draft laboratory area at about 30° C. until constant weight is achieved, this latter checked against the weight loss of the former procedure.

Dried enzyme may be pelleted into tablet form by machines which are no part of the instant invention.

EXAMPLE II

After cleaning away the rough edge of tablets averaging approximately 300 milligrams per tablet and assaying about 1,000 units of glucose oxidase and 350 units of catalase, 10,000 tablets were placed in a coating pan and the pan rotated. Approximately 100 ml. of wax-free shellac in alcohol solution of about 25% solids content was added. The tablets were allowed to roll until they showed signs of solvent evaporation by becoming tacky. At this point a small amount of finely powdered talc was added as a dusting agent. When the tablets were rolling freely in the pan, a blast of room temperature air was directed against the tablets to remove most of the remaining alcohol. Air blasting was continued for about 10 minutes. The tablets were then dried for about ½ hour using air at a temperature of about 85° F. to 100° F. while the pan continued to rotate. The coating operation was repeated until a coating was formed from a total of 15 coating operations.

Tablets prepared according to Example II and uncoated tablets from the same source were tested as follows:

One tablet was added to apple juice heated to a temperature of about 180° F. The container was closed and the apple juice cooled to room temperature. The activity of glucose oxidase introduced in the form of the coated tablets of Example II was substantially unimpaired by introduction into the hot apple juice and by retention therein during the cooling operation. Glucose oxidase introduced using uncoated tablets have the enzymatic activity substantially completely eliminated by introduction into the 180° F. apple juice by the time the apple juice had cooled to room temperature.

EXAMPLE III

Core tablets were prepared from a mixture containing in parts by weight, 10 parts polyethylene glycol, 10 parts corn starch, 2 parts calcium stearate, 75 parts mannitol and 3 parts glucose-oxidase catalase powder. The tablets were dried to constant weight at a temperature of about 40° C.

The tablets were coated in the same manner as was described in Example II.

Glucose oxidase-catalase activity is present in the apple juice at the end of the cooling operation in quantities sufficient to deoxygenate the container.

EXAMPLE IV

A solution was prepared by dissolving 17 parts by weight of stearic acid in 240 parts by weight of 90% ethanol at about 40° C. To this solution was added 100 parts by weight of zein (corn protein) and the mixture agitated until the zein dissolved. To the substantially homogeneous solution was added 8 parts by weight of oleic acid.

To the zein solution was added 5 parts by weight of glucose oxidase preparation and the resulting suspension was spread on the lids for metallic containers in a thickness providing a dried surface coating of approximately 50 mils in depth.

After filling the containers with hot liquid at a temperature of about 160° F., the containers were closed and set aside for cooling. When the containers had cooled to room temperature, glucose oxidase-catalase activity was present in quantities sufficient to deoxygenate the container.

EXAMPLE V 100 parts by weight of zein was dissolved in a mixture of 120 parts of anhydrous ethyl alcohol and 80 parts of ethylene dichloride. To the zein solution was added 30 parts by weight of glycerol monooleate.

This solution was utilized to coat enzyme tablets in the same manner as was explained in Example II except that no talc was required between the layers.

Tablets prepared according to Example V and uncoated tablets from the same source were tested as follows:

One tablet was added to apple juice heated to a temperature of about 180° F. The container was closed and the apple juice cooled to room temperature. The activity of glucose oxidase introduced in the form of the coated tablets of Example V was substantially unimpaired by introduction into the hot apple juice and by retention therein during the cooling operation. Glucose oxidase introduced using uncoated tablets have the enzymatic activity substantially completely eliminated by introduction into the 180° F. apple juice.

I claim:

1. The method of protecting packaged, heat-processed, aqueous food from deterioration due to oxygen comprising, incorporating in said food prior to closing said package and before completion of said processing, an enzyme preparation containing glucose oxidase enzyme dried under conditions avoiding enzyme inactivation by heat, said preparation being insulated against the enzyme inactivating effect of the elevated temperatures encountered in processing by a coating of film forming material which is slowly penetrated by moisture, at least one of said aqueous food and said preparation supplying glucose, the thickness of said coating and the rate of penetration by moisture of said material providing a predetermined interval of time between contact of the coated enzyme with aqueous medium and moisturizing of the enzyme to a water content activating said enzyme, and completing said elevated temperature processing during said interval of time whereby said enzyme is protected against inactivation by said elevated temperature treatment and is released to provide its oxygen-removing function after processing is completed.

2. The method of claim 1 in which said enzyme preparation is dried to substantially constant weight at temperatures below 70° C.

3. The method of claim 1 in which said film forming material is selected from the group consisting of water-insoluble synthetic gums, water-insoluble, alcohol-soluble natural resinous gums, proteins and formaldehyde-treated proteins, and water-insoluble copolymers of polyvinyl acetate.

4. The method of claim 3 in which the film forming material is zein.

5. The method of claim 1 in which said package is hermetically sealed before completion of said elevated temperature processing.

References Cited by the Examiner

UNITED STATES PATENTS

| | | | |
|---|---|---|---|
| 2,482,724 | 9/49 | Baker | 99—186 |
| 2,642,376 | 6/53 | Gale et al. | 195—63 |
| 2,689,203 | 9/54 | Lolli | 195—63 |
| 2,744,017 | 5/56 | Baldwin | 99—150 |
| 2,765,233 | 10/56 | Sarett et al. | 99—178 |
| 2,894,843 | 7/59 | Malecki | 99—166 |
| 3,006,815 | 10/61 | Scott | 195—63 |

FOREIGN PATENTS 537,982   7/41   Great Britain.

A. LOUIS MONACELL, *Primary Examiner.*

TOBIAS E. LEVOW, *Examiner.*